US009902458B2

(12) United States Patent
Matsushima

(10) Patent No.: US 9,902,458 B2
(45) Date of Patent: Feb. 27, 2018

(54) VEHICLE BODY FRAME STRUCTURE FOR SADDLED VEHICLE

(71) Applicant: HONDA MOTOR CO., LTD., Minato-Ku, Tokyo (JP)

(72) Inventor: Satoshi Matsushima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/916,276

(22) PCT Filed: Sep. 5, 2013

(86) PCT No.: PCT/JP2013/073980
§ 371 (c)(1),
(2) Date: Mar. 3, 2016

(87) PCT Pub. No.: WO2015/033425
PCT Pub. Date: Mar. 12, 2015

(65) Prior Publication Data
US 2016/0200387 A1    Jul. 14, 2016

(51) Int. Cl.
*B62K 11/04*    (2006.01)
*B62K 19/48*    (2006.01)
*B62K 19/16*    (2006.01)
*B62J 99/00*    (2009.01)

(52) U.S. Cl.
CPC .............. *B62K 19/48* (2013.01); *B62K 11/04* (2013.01); *B62K 19/16* (2013.01); *B62J 99/00* (2013.01)

(58) Field of Classification Search
CPC ........ B62K 19/48; B62K 11/04; B62K 19/16; B62J 99/00

USPC ........................................................ 180/219
See application file for complete search history.

(56) References Cited

U.S. PATENT DOCUMENTS

| 4,852,678 A * | 8/1989 | Yamaguchi ............ B62K 19/12 180/219 |
| 8,146,699 B2 | 4/2012 | Asano |
| 2009/0194355 A1* | 8/2009 | Yamamoto ............ B62K 11/04 180/312 |
| 2009/0230654 A1* | 9/2009 | Yuliang .................. B62K 11/04 280/281.1 |

(Continued)

FOREIGN PATENT DOCUMENTS

| JP | 2000-313388 A | 11/2000 |
| JP | 2005-219742 A | 8/2005 |

(Continued)

OTHER PUBLICATIONS

Office Action issued in the corresponding Japanese Patent Application No. 2015-535222 dated Mar. 22, 2017.

*Primary Examiner* — Jacob D Knutson
(74) *Attorney, Agent, or Firm* — Carrier Blackman & Associates, P.C.; William D. Blackman; Joseph P. Carrier

(57) ABSTRACT

A vehicle body frame structure for a saddled vehicle is provided in which a rear frame supporting a riding seat is formed from a fiber-reinforced resin and is linked to a front frame supporting an engine so as to extend to the rear from the front frame, wherein the rear frame is formed by joining a pair of left and right side walls, an upper cross member linking upper parts of the two side walls, and a lower cross member linking lower parts of the two side walls. This enables a rear frame to be produced with enhanced productivity while avoiding poor yield.

18 Claims, 9 Drawing Sheets

(56) References Cited

U.S. PATENT DOCUMENTS

2009/0242305 A1* 10/2009 Asano ................. F02M 35/162
                                                           180/219
2013/0270229 A1* 10/2013 Pedersen ................. B21J 15/02
                                                           219/106
2013/0278025 A1* 10/2013 Wakabayashi ......... B62K 19/16
                                                           297/195.1

FOREIGN PATENT DOCUMENTS

| JP | 2009-234402 A | 10/2009 |
| WO | 2012/090848 A1 | 7/2012 |

* cited by examiner

VEHICLE BODY FRAME STRUCTURE FOR SADDLED VEHICLE

TECHNICAL FIELD

The present invention relates to a vehicle body frame structure for a saddled vehicle in which a rear frame supporting a riding seat is formed from a fiber-reinforced resin and is linked to a front frame supporting an engine so as to extend to a rear from the front frame.

BACKGROUND ART

A rear frame, made of a fiber-reinforced resin, arranged so as to have a pair of left and right side walls and a bottom wall integrally linking lower parts of the side walls is known from Patent Document 1.

RELATED ART DOCUMENTS

Patent Documents

Patent Document 1: International Patent Application Laid-open WO2012/090848A1

SUMMARY OF THE INVENTION

Problems to be Solved by the Invention

However, as disclosed in Patent Document 1 above, when a rear fame is molded integrally using a fiber-reinforced resin, integrally molding a rear frame that has a large size and a complicated shape results in poor yield and makes it impossible to reduce the cost.

The present invention has been accomplished in light of the above circumstances, and it is an object thereof to provide a vehicle body frame structure for a saddled vehicle that enables a rear frame to be produced from a fiber-reinforced resin with enhanced productivity while avoiding poor yield.

Means for Solving the Problems

In order to attain the above object, according to a first aspect of the present invention, there is provided a vehicle body frame structure for a saddled vehicle in which a rear frame supporting a riding seat is formed from a fiber-reinforced resin and is linked to a front frame supporting an engine so as to extend to a rear from the front frame, characterized in that the rear frame is formed by joining a pair of left and right side walls, an upper cross member formed separately from the side walls and linking upper parts of the two side walls, and a lower cross member formed separately from the side walls and linking lower parts of the two side walls.

Further, according to a second aspect of the present invention, in addition to the first aspect, the side wall is formed so as to integrally have a side plate portion forming a vehicle body side face, an upper edge projecting portion projecting inwardly from an upper end of the side plate portion, and a lower edge projecting portion projecting inwardly from a lower end of the side plate portion.

According to a third aspect of the present invention, in addition to the second aspect, the upper cross member is joined to the upper edge projecting portion, and the lower cross member is joined to the lower edge projecting portion.

According to a fourth aspect of the present invention, in addition to any one of the first to third aspects, an opening is formed in the side plate portion, and an opening edge projecting portion projecting inwardly from a peripheral edge of the opening is provided integrally with the side plate portion.

According to a fifth aspect of the present invention, in addition to any one of the first to fourth aspects, the pair of left and right side walls are disposed so that a gap between front parts of the side walls enlarges in going downward, and a cleaner box of an air cleaner is disposed between the front parts of the two side walls.

According to a sixth aspect of the present invention, in addition to the fifth aspect, a fastening part along a plane that crosses a vehicle width direction obliquely is formed integrally with a front side lower part of the side wall, and the fastening part is fastened to the front frame.

According to a seventh aspect of the present invention, in addition to the third aspect, a front and rear pair of the upper cross members is provided between upper parts of the pair of left and right side walls so that the riding seat is supported by the upper cross members and the upper edge projecting portion between the upper cross members.

Moreover, according to an eighth aspect of the present invention, in addition to the seventh aspect, the lower cross member is disposed beneath the upper cross member which, among the pair of front and rear upper cross members, is the one to the rear, and the lower cross member and a muffler stay supporting an exhaust muffler are tightened together and joined to the lower edge projecting portion.

Effects of the Invention

In accordance with the first aspect of the present invention, since the rear frame is formed by joining to the pair of left and right side walls the upper cross member and the lower cross member, which are separate members from the side wall, it is possible to reduce the size of the side wall, the upper cross member, and the lower cross member, which form the rear frame, thus enhancing the productivity and improving the yield and, in particular, although the side wall and the upper and lower cross members have different extending directions, such members having different extending directions are formed as separate members, thus enabling the size of a production mold and a production line to be reduced. Furthermore, since the upper parts of the side walls are linked by the upper cross member, and the lower parts of the side walls are linked by the lower cross member, it is possible to reliably suppress any widening between the pair of left and right side walls.

Furthermore, in accordance with the second aspect of the present invention, since the side wall integrally has the side plate portion, the upper edge projecting portion projecting inwardly from the upper end of the side plate portion, and the lower edge projecting portion projecting inwardly from the lower end of the side plate portion, it is possible to enhance the strength of the side wall.

In accordance with the third aspect of the present invention, since the upper cross member is joined to the upper edge projecting portion, and the lower cross member is joined to the lower edge projecting portion, parts where the side wall is joined to the upper and lower cross members are not exposed on the side face of the vehicle body, and it is possible to enhance the appearance while preventing the foot of a rider from hitting them.

In accordance with the fourth aspect of the present invention, since the opening is formed in the side plate portion, which has a relatively large area, and the opening edge projecting portion is provided integrally with the side plate portion, it is possible to enhance the strength of the side wall while enhancing the appearance.

In accordance with the fifth aspect of the present invention, since the gap between the front parts of the side walls becomes larger in going downward, and the cleaner box is disposed between the front parts of the two side walls, it is possible, while avoiding widening of the riding seat supported by the upper part of the rear frame, to increase the capacity of the cleaner box.

In accordance with the sixth aspect of the present invention, since the fastening part formed integrally with the front side lower part of the side wall along the plane crossing the vehicle width direction obliquely is secured to the front frame, it is possible, even if the side wall is thin, to increase the section modulus in the vehicle width direction of the fastening part, thus enhancing the rigidity of the part thereof secured to the front frame. Furthermore, since the fastening part following the plane crossing the vehicle width direction obliquely is formed on the front side lower part of the side wall, which has a large gap between the left and right side walls, it is possible to prevent any influence on the width of the riding seat or the ease of placing a foot on the ground.

In accordance with the seventh aspect of the present invention, since the riding seat is supported by the pair of front and rear upper cross members and the upper edge projecting portion of the side wall between the upper cross members, it is possible to support the riding seat well.

Moreover, in accordance with the eighth aspect of the present invention, since the lower cross member is disposed beneath the upper cross member that, among the upper cross members forming a front and rear pair, is on the rear side, and the muffler stay and the lower cross member are tightened together and joined to the lower edge projecting portion, it is possible to ensure the strength of the rear frame by disposing the upper and lower cross members at positions into which a load due to vibration of the exhaust muffler is input from the muffler stay supporting the exhaust muffler.

EXPLANATION OF REFERENCE NUMERALS AND SYMBOLS

Figure 1:
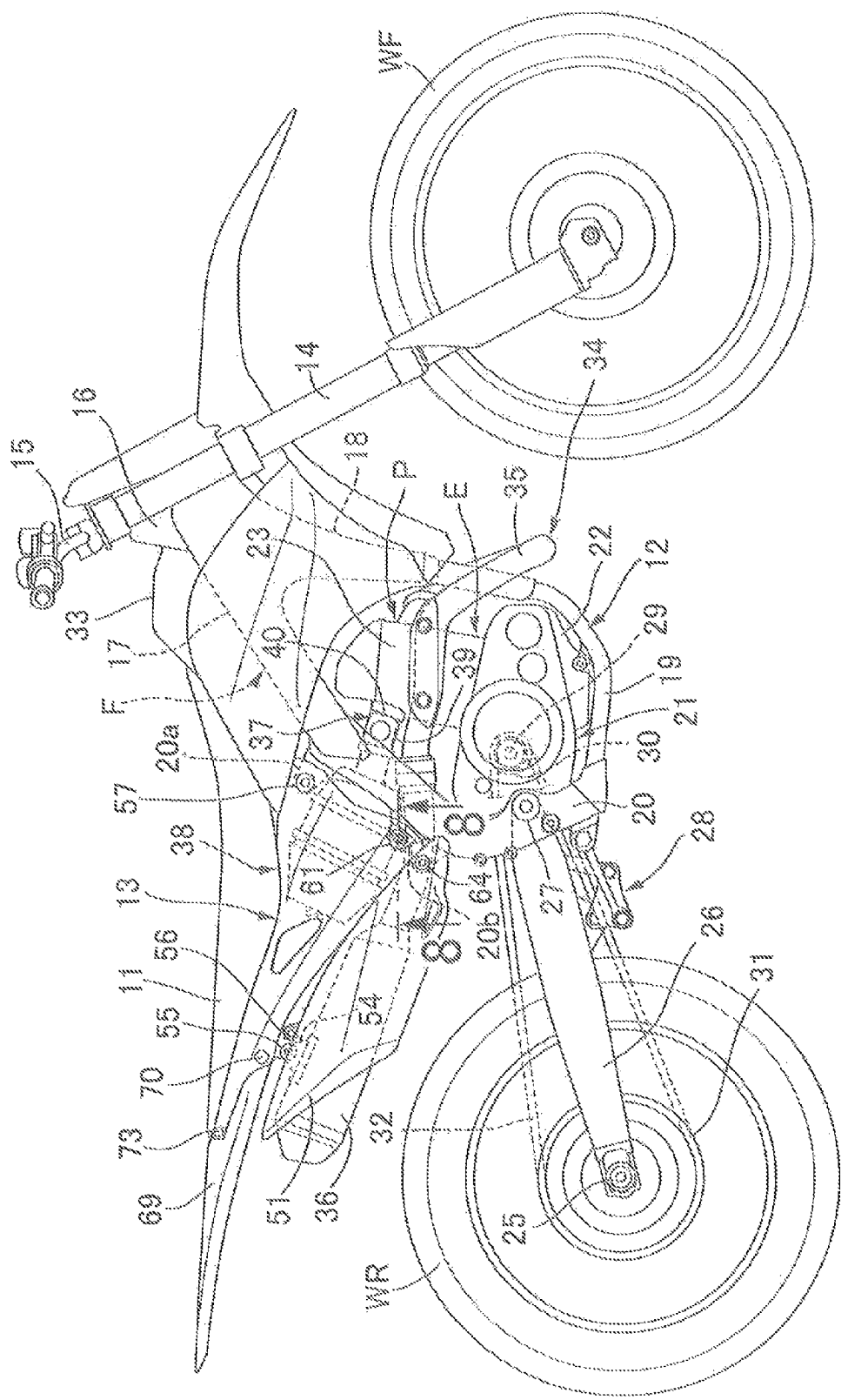
FIG. 1 is a side view of an essential part of a two-wheeled motor vehicle. (first embodiment)

11 Riding seat
12 Front frame
13 Rear frame
36 Exhaust muffler
38 Air cleaner
42 Side wall
42a Side plate portion
42b Upper edge projecting portion
42c Lower edge projecting portion
42d Opening edge projecting portion
43, 44 Upper cross member
45 Lower cross member
46 Opening
49 Muffler stay
63 Fastening part
81 Cleaner box
E Engine

MODE FOR CARRYING OUT THE INVENTION

An embodiment of the present invention is explained below by reference to the attached FIG. 1 to FIG. 11. In the explanation below, front and rear, left and right, and up and down mean directions as viewed by a person riding a two-wheeled motor vehicle.

First Embodiment

First, in FIG. 1, this saddled vehicle is a two-wheeled motor vehicle for a motocross competition; its vehicle body frame F includes a front frame 12 supporting a power unit P that exerts power for driving a rear wheel WR, which is a driven wheel, and a rear frame 13 supporting a riding seat 11, the rear frame 13 being formed from a fiber-reinforced resin and linked to the front frame 12, from which it extends rearward.

The front frame 12 includes a head pipe 16 steerably supporting a front fork 14 axially supporting a front wheel WF and bar-shaped handlebars 15, a pair of left and right main frames 17 extending downward to the rear from the head pipe 16, a down frame 18 extending downward to the rear from the head pipe 16 at a steeper angle than the main frames 17, a pair of left and right lower frames 19 provided so as to be connected to a lower end part of the down frame 18 and extending to the rear, and a pair of left and right pivot frames 20 having their upper end parts joined to rear end parts of the main frames 17, extending downward, and having rear end parts of the two lower frames 19 connectedly provided on lower end parts thereof.

Supported on the front frame 12 is the power unit P that includes an engine E, and mounted on the front frame 12 so as to be disposed in a region surrounded by the main frame 17, the down frame 18, the lower frame 19, and the pivot frame 20 when viewed from the side is an engine main body 21 of the engine E.

An axle 25 of the rear wheel WR is axially supported on a rear end part of a swing arm 26 extending in the fore-and-aft direction, and a front end part of the swing arm 26 is vertically swingably supported on a lower part of the pivot frame 20 via a support shaft 27. Provided between the lower part of the pivot frame 20 and the swing arm 26 is a link mechanism 28.

Housed within a crankcase 22 forming part of the engine main body 21 is a transmission (not illustrated) that, together with the engine E, forms the power unit P, an output shaft 29 of the transmission projecting leftward from the crankcase 22, and an endless chain 32 being wound around a drive sprocket 30 provided on the output shaft 29 and a driven sprocket 31 provided on the axle 25 of the rear wheel WR.

Furthermore, a fuel tank 33 is provided on the two main frames 17 above the engine main body 21, and the riding seat 11 is disposed to the rear of the fuel tank 33 so as to be supported by the rear frame 13.

An exhaust system 34 connected to a front side wall of a cylinder head 23 forming part of the engine main body 21 includes a pair of left and right exhaust pipes 35 connected to the cylinder head 23 and extending to the rear from the side of the engine main body 21, and a pair of left and right exhaust mufflers 36 disposed on opposite sides, in the vehicle width direction, of the rear wheel WR and individually connected to the exhaust pipes 35.

Moreover, an air intake device 37 connected to a rear side wall of the cylinder head 23 includes an air cleaner 38, part of which is formed from the rear frame 13, a throttle body 39 having its upstream end connected to the air cleaner 38, and an air intake tube 40 providing a connection between the throttle body 39 and the cylinder head 23.

Referring in addition to FIG. 2 to FIG. 5, the rear frame 13, which is formed from a fiber-reinforced resin, for example a carbon fiber-reinforced resin, is formed by joining a pair of left and right side walls 42, first and second upper cross members 43 and 44 formed separately from the side walls 42 and linking upper parts of the two side walls 42, and a lower cross member 45 formed separately from the side walls 42 and linking lower parts of the two side walls 42.

The side wall 42 is formed so as to integrally have a side plate portion 42a forming a vehicle body side face, a flat plate-shaped upper edge projecting portion 42b extending along an upper end of the side plate portion 42a and projecting inwardly from the upper end, and a flat-plate shaped lower edge projecting portion 42c extending along a lower end of the side plate portion 42a and projecting inwardly from the lower end. The upper edge projecting portion 42b at the upper edge of the side plate portion can also be described as an inwardly-projecting flange portion. Furthermore, an opening 46 is formed in the side plate portion 42a, and an opening edge projecting portion 42d (FIGS. 3, 4), projecting inwardly from the peripheral edge of the opening 46, is provided integrally with the side plate portion 42a. Moreover, the opening 46 is disposed in an intermediate portion between the pair of front and rear upper cross members 43 and 44 in the vehicle fore-and-aft direction.

The first and second upper cross members 43 and 44, which form a front and rear pair, are provided between the upper parts of the pair of left and right side walls 42 so as to support the riding seat 11 by means of the upper cross members 43 and 44 and the upper edge projecting portion 42b between the upper cross members 43 and 44.

Figure 6:
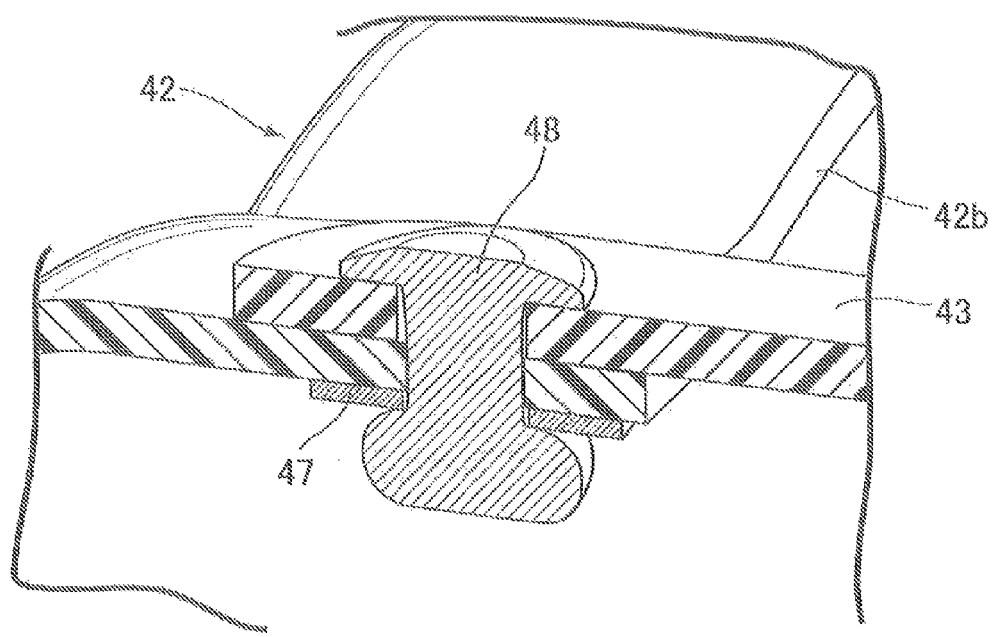
FIG. 6 is a sectional view along line 6-6 in FIG. 2. (first embodiment)

In FIG. 6, opposite end parts of the first upper cross member 43 are joined to the upper edge projecting portion 42b of the side wall 42. That is, an end part, along the vehicle width direction, of the first upper cross member 43 is placed on the upper edge projecting portion 42b of the side wall 42 with an adhesive interposed therebetween, and a washer 47 abutting against a lower face of the upper edge projecting portion 42b, the upper edge projecting portion 42b, and the end part of the first upper cross member 43 are joined by means of a plurality of, for example two, rivets 48. In this arrangement, the end part, along the vehicle width direction, of the first upper cross member 43 does not project outwardly from the side plate portion 42a of the side wall 42.

Furthermore, the second upper cross member 44 which, among the first and second upper cross members 43 and 44, is disposed further rearward is joined to the upper edge projecting portion 42b via the same structure as the structure via which the first upper cross member 43 is joined to the upper edge projecting portion 42b.

Figure 7:
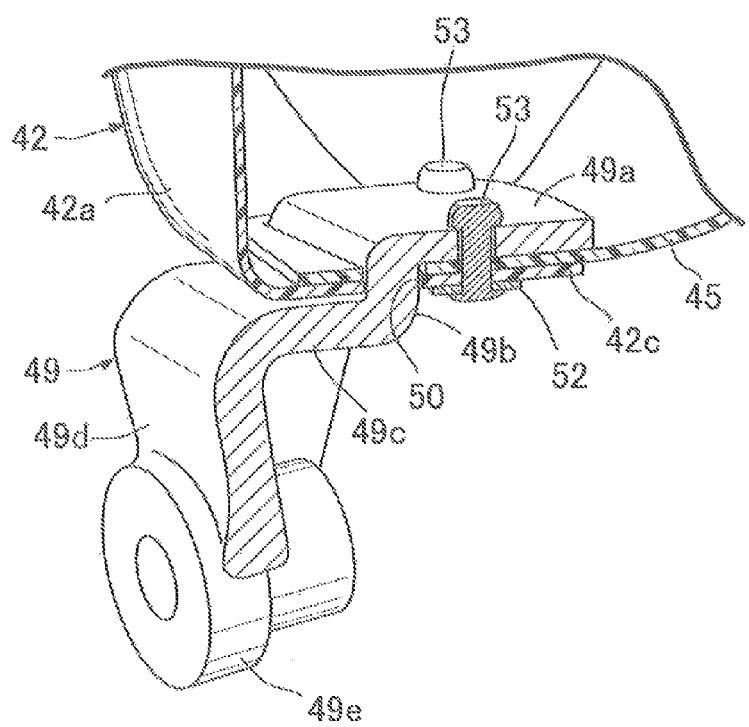
FIG. 7 is a sectional view along line 7-7 in FIG. 2. (first embodiment)

Furthermore, the lower cross member 45 is disposed beneath the second upper cross member 44, and opposite end parts of the lower cross member 45 are joined by tightening them, together with a metal muffler stay 49 supporting the exhaust muffler 36, to the lower edge projecting portion 42c of the side wall 42 as shown in FIG. 7.

An end part, along the vehicle width direction, of the lower cross member 45 abuts against the lower edge projecting portion 42c of the side wall 42 with an adhesive (not illustrated) interposed therebetween. The muffler stay 49 integrally has a flat plate-shaped mounting plate portion 49a superimposed on the end part of the lower cross member 45 with an adhesive (not illustrated) interposed therebetween, a flat plate-shaped vertical plate portion 49b connectedly provided at the outer end, in the vehicle width direction, of the mounting plate portion 49a so as to extend beneath the lower edge projecting portion 42c while extending through a slit 50 provided in the end part of the lower cross member 45 and the lower edge projecting portion 42c, a horizontal plate portion 49c connectedly provided at the lower end of the vertical plate portion 49b and extending outwardly in the vehicle width direction beneath the lower edge projecting portion 42c, a support plate portion 49d extending downward from the outer end in the vehicle width direction of the horizontal plate portion 49c, a muffler support boss portion 49e provided on the support plate portion 49d so as to support the exhaust muffler 36, and a cover support boss portion 49f provided on the support plate portion 49d so as to be disposed adjacent to and in front of the muffler support boss portion 49e in order to support a rear part of a muffler cover 51 covering, from above, the exhaust muffler 36; a washer 52 abutting against a lower face of the lower edge projecting portion 42c, the upper edge projecting portion 42b, the end part of the lower cross member 45, and the mounting plate portion 49a of the muffler stay 49 are joined by means of a plurality of, for example three, rivets 53.

Focusing on FIG. 1, secured to the muffler support boss portion 49e by means of a bolt 55 is a mounting plate 54 provided on the exhaust muffler 36. Furthermore, secured to the cover support boss portion 49f by means of a bolt 56 is a rear part of the muffler cover 51.

Figure 5:
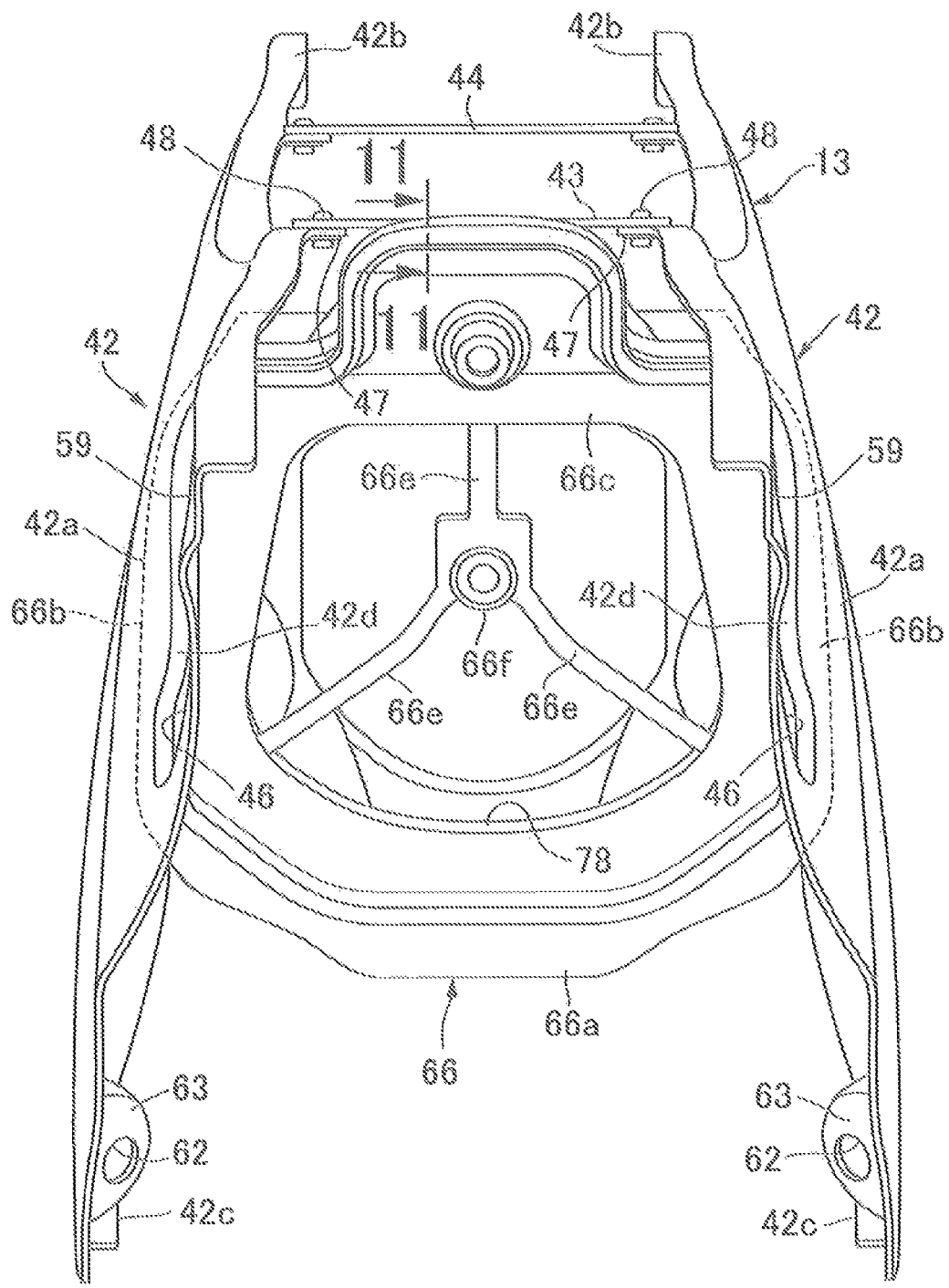
FIG. 5 is a view from the direction of arrow 5 in FIG. 2 of the rear frame in a state in which the cleaner case is mounted. (first embodiment)

As described above, in a state in which the first and second upper cross members 43 and 44 and the lower cross member 45 are joined to the pair of left and right side walls 42, the pair of left and right side walls 42 are disposed so that, as clearly shown in FIG. 5, the gap between the front parts of the side walls 42 becomes larger in going downward.

First and second support stays 20a and 20b are provided integrally with the pivot frame 20 of the front frame 12; the first support stay 20a is mounted on an upper part of the pivot frame 20 and projects toward the rear frame 13 side, and the second support stay 20b is provided in an intermediate part in the vertical direction of the pivot frame 20 and projects toward the rear frame 13 side.

In order to be secured to the first support stay 20a, a first fastening part 59 having a first through hole 58 is formed on a front side upper part of the side plate portion 42a of the side wall 42 of the rear frame 13, a bolt 57 being inserted through the first through hole 58.

Figure 8:
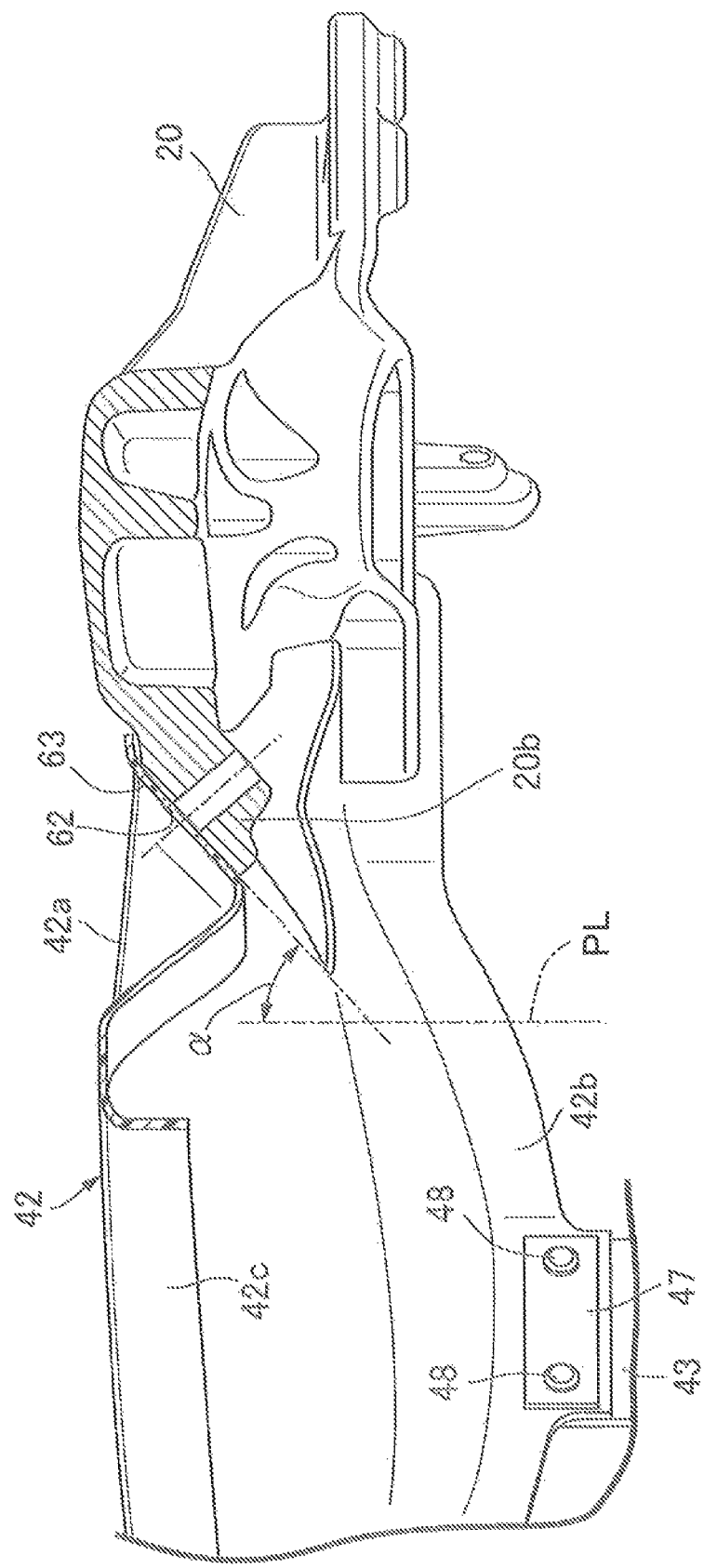
FIG. 8 is a sectional view along line 8-8 in FIG. 1. (first embodiment)

Furthermore, in order to be secured to the second support stay 20b, as shown in FIG. 8, a second fastening part 63 having a second through hole 62 is integrally formed with a front side lower part of the side plate portion 42a of the side wall 42 so as to follow a plane crossing the vehicle width direction, that is, a plane obliquely crossing a vertical face PL extending in the vehicle width direction, at an angle α of for example 45 degrees, a bolt 61 being inserted through the second through hole 62. Furthermore, a front part of the muffler cover 51 is also secured to the second support stay 20b by means of a bolt 64.

Figure 2:
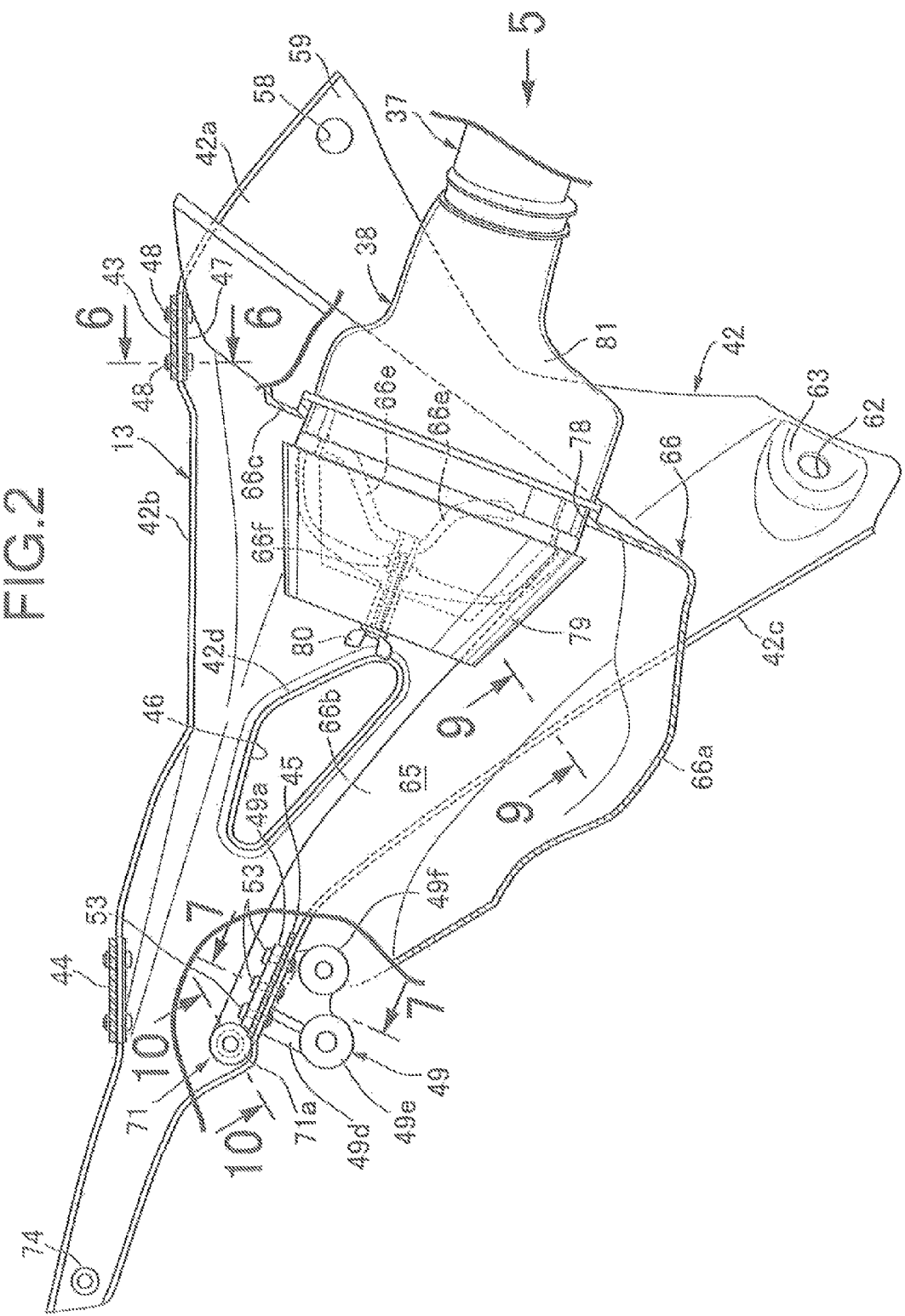
FIG. 2 is a side view of a rear frame in a state in which a cleaner case is mounted. (first embodiment)
Figure 3:
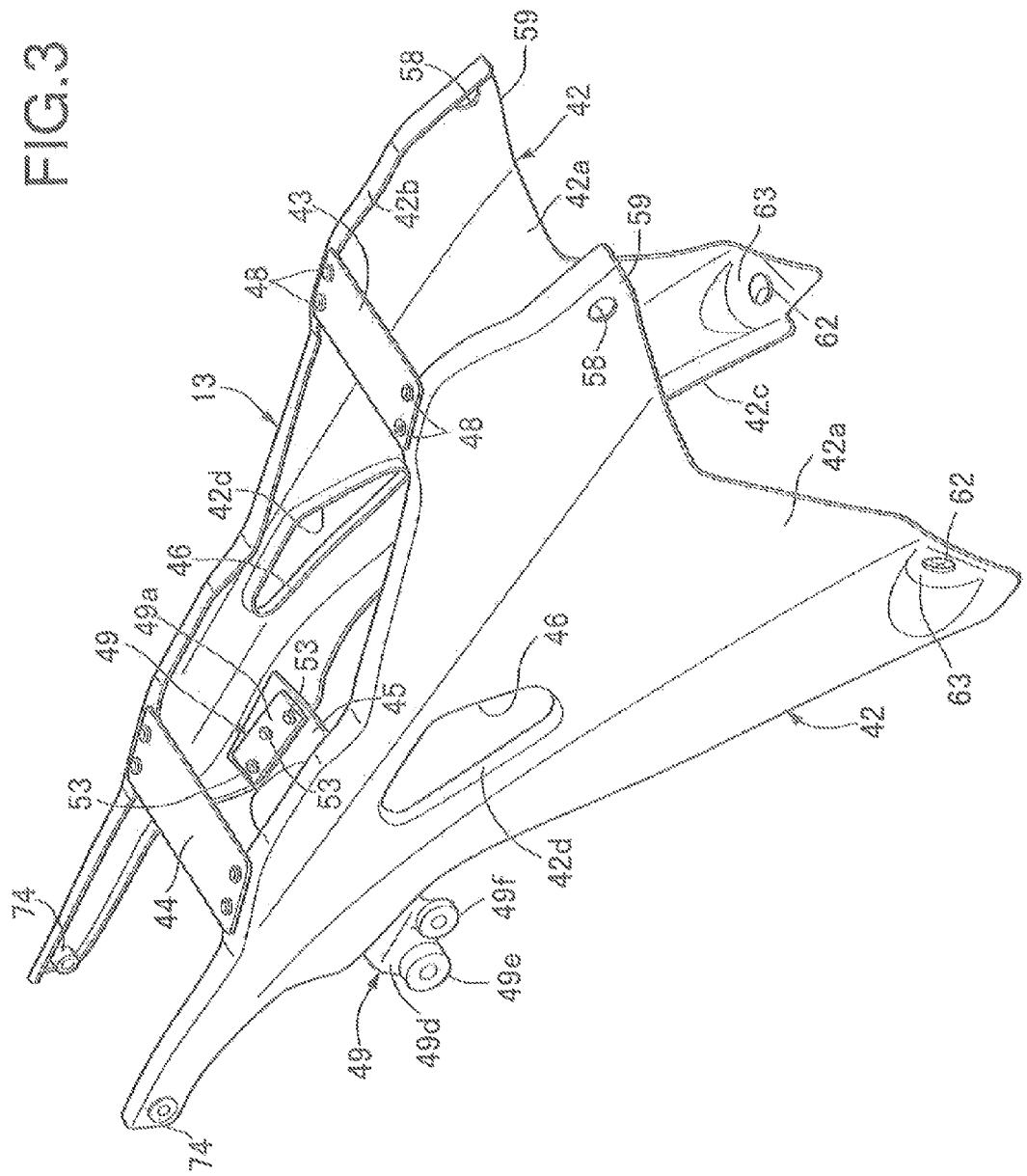
FIG. 3 is a perspective view when the rear frame is viewed obliquely from the front. (first embodiment)
Figure 4:
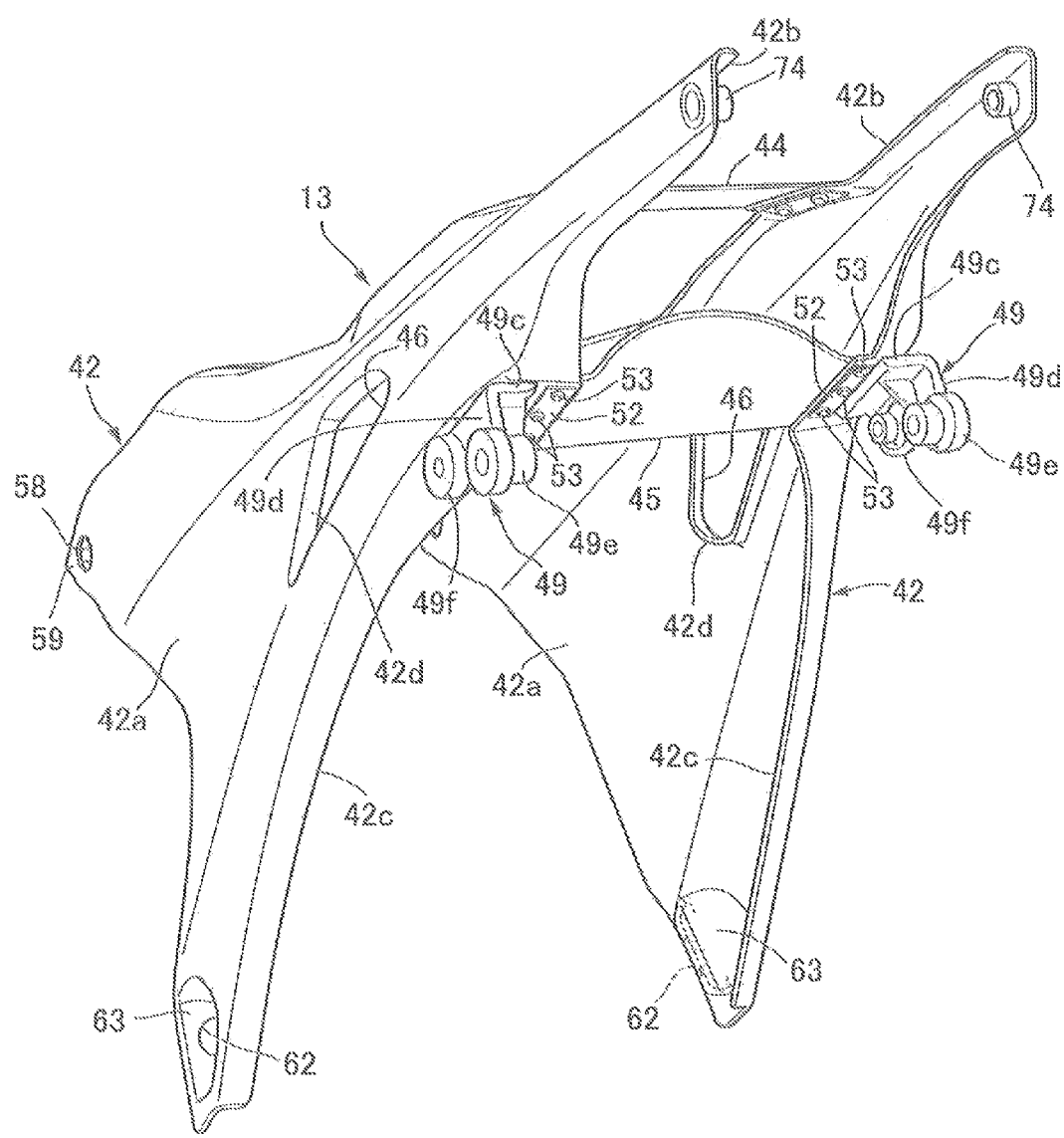
FIG. 4 is a perspective view when the rear frame is viewed obliquely from the rear. (first embodiment)

Focusing on FIG. 2 and FIG. 5, mounted on the rear frame 13 is a cleaner case 66 that, in cooperation with the rear frame 13 and the riding seat 11 supported on the rear frame 13, forms an uncleaned chamber 65 of the air cleaner 38.

This cleaner case 66 integrally has a bottom wall portion 66a extending between the lower parts of the pair of left and right side walls 42, a pair of left and right lateral edge plate portions 66b extending slightly upward along an inner face of the side wall 42 from opposite ends, in the vehicle width direction, of the bottom wall portion 66a, and a partition wall portion 66c connected to front end parts of the bottom wall portion 66a and the lateral edge plate portion 66b while extending vertically so that its left and right edges abut against the inner faces of the pair of left and right side walls 42. The uncleaned chamber 65 is formed to the rear of the partition wall portion 66c.

Figure 9:
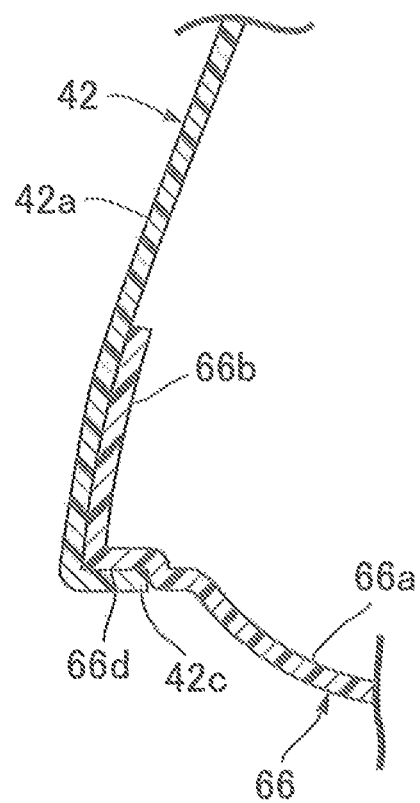
FIG. 9 is a sectional view along line 9-9 in FIG. 2. (first embodiment)

In FIG. 9, a step portion 66d facing downward is formed on an intermediate part of the lateral edge plate portion 66b, and this step portion 66d is placed on the lower edge projecting portion 42c of the side wall 42.

Figure 10:
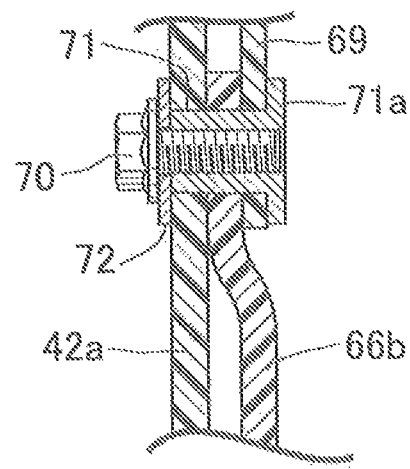
FIG. 10 is a sectional view along line 10-10 in FIG. 2. (first embodiment)

In FIG. 10, a rear end part of the lateral edge plate portion 66b is secured to the side plate portion 42a of the side wall 42 together with a front part of a rear fender 69 covering the rear wheel WR from above. The front part of the rear fender 69 is disposed so as to sandwich a rear end part of the lateral edge plate portion 66b between itself and an inner face of the side plate portion 42a, a collar nut 71 having a collar portion 71a abutting against the rear fender 69 is inserted through the rear fender 69, the lateral edge plate portion 66b, and the side plate portion 42a, and a bolt 70 is screwed into the collar nut 71 with a washer 72 interposed between the bolt 70 and an outer face of the side plate portion 42a.

Furthermore, provided on a rear end part of the side plate portion 42a of the side wall 42 is a boss 74 for a bolt 73 to be screwed into in order to secure the rear fender 69, two locations on each of the left and right of the rear fender 69 being supported on the rear frame 13.

Figure 11:
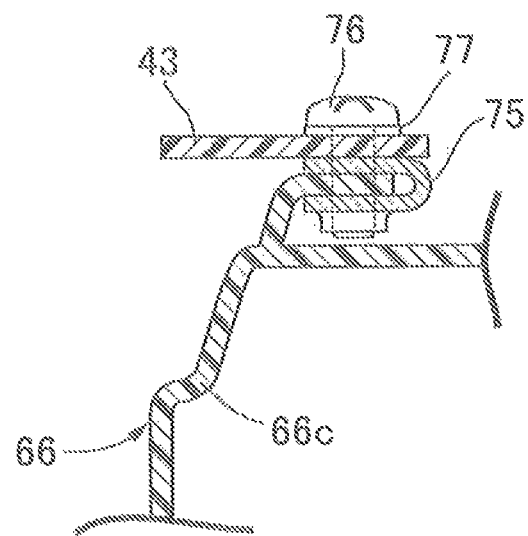
FIG. 11 is a sectional view along line 11-11 in FIG. 5. (first embodiment)

In FIG. 11, a clip nut 75 abutting against a lower face of the first upper cross member 43 is fitted onto two locations, separated in the vehicle width direction, of an upper part of the partition wall portion 66c of the cleaner case 66, and a screw member 76 having a washer 77 interposed between itself and the first upper cross member 43 is screwed into the clip nut 75.

Focusing on FIG. 2 and FIG. 5, an opening 78 is formed in the partition wall portion 66c of the cleaner case 66, three support frame portions 66e extending toward the uncleaned chamber 65 side from a plurality of locations of the peripheral edge of the opening 78 are provided integrally with the partition wall portion 66c, and extremities of the support frame portions 66e are provided so as to be connected in common to a single mounting tube portion 66f.

The support frame portion 66e and the mounting tube portion 66f are covered by a bag-shaped cleaner element 79 housed on the uncleaned chamber 65 side, and this cleaner element 79 is mounted on the mounting tube portion 66f by means of a bolt 80.

A cleaner box 81, into which air that has been filtered by means of the cleaner element 79 is introduced, is mounted on the partition wall portion 66c, and this cleaner box 81 is disposed between the front parts of the two side walls 42 of the rear frame 13.

The operation of this embodiment is now explained; since the rear frame 13 made of a fiber-reinforced resin is formed by joining the pair of left and right side walls 42, the first and second upper cross members 43 and 44 formed separately from the side walls 42 and linking the upper parts of the two side walls 42, and the lower cross member 45 formed separately from the side walls 42 and linking the lower parts of the two side walls 42, it is possible to reduce the size of the side wall 42, the first and second upper cross members 43 and 44, and the lower cross member 45, which form the rear frame 13, thus enhancing the productivity and improving the yield and, in particular, although the side wall 42 and the first upper cross members 43 and 44 and lower cross member 45 have different extending directions, such members having different extending directions are formed as separate members, thus enabling the size of a production mold and a production line to be reduced. Furthermore, since the upper parts of the side walls 42 are linked by the first and second upper cross members 43 and 44, and the lower parts of the side walls 42 are linked by the lower cross member 45, it is possible to reliably suppress any widening between the pair of left and right side walls 42.

Moreover, since the side wall 42 is formed so as to integrally have the side plate portion 42a forming the vehicle body side face, the upper edge projecting portion 42b projecting inwardly from the upper end of the side plate portion 42a, and the lower edge projecting portion 42c projecting inwardly from the lower end of the side plate portion 42a, it is possible to enhance the strength of the side wall 42.

Furthermore, since the first and second upper cross members 43 and 44 are joined to the upper edge projecting portion 42b, and the lower cross member 45 is joined to the lower edge projecting portion 42c, parts where the side wall 42 is joined to the first upper cross member 43, the second upper cross member 44 and the lower cross member 45 are not exposed on the side face of the vehicle body, and it is possible to enhance the appearance while preventing the foot of a rider from hitting them.

Moreover, since the opening 46 is formed in the side plate portion 42a, which has a relatively large area, and the opening edge projecting portion 42d projecting inwardly from the peripheral edge of the opening 46 is provided integrally with the side plate portion 42a, it is possible to enhance the strength of the side wall 42 while enhancing the appearance.

Furthermore, since the pair of left and right side walls 42 are disposed so that the gap between the front parts of the side walls 42 becomes larger in going downward, and the cleaner box 81 of the air cleaner 38 is disposed between the front parts of the two side walls 42, it is possible, while avoiding widening of the riding seat 11 supported by the upper part of the rear frame 13, to increase the capacity of the cleaner box 81.

Moreover, since the second fastening part 63 following the plane crossing the vehicle width direction obliquely is formed integrally with the front side lower part of the side wall 42, and the second fastening part 63 is secured to the front frame 12, it is possible, even if the side wall 42 is thin, to increase the section modulus in the vehicle width direction of the second fastening part 63, thus enhancing the rigidity of the part thereof secured to the front frame 12. Furthermore, since the second fastening part 63 following the plane crossing the vehicle width direction obliquely is formed on the front side lower part of the side wall 42, which has a large gap between the left and right side walls 42, it is possible to prevent any influence on the width of the riding seat 11 or the ease of placing a foot on the ground.

Moreover, since the riding seat 11 is supported by the pair of front and rear upper cross members 43 and 44 and the upper edge projecting portion 42b of the side wall 42 between the upper cross members 43 and 44, it is possible to support the riding seat 11 well.

Furthermore, since the lower cross member 45 is disposed beneath the second upper cross member 44 which, among the first and second upper cross members 43 and 44 forming a front and rear pair, is on the rear side, and the muffler stay 49 supporting the exhaust muffler 36 and the lower cross member 45 are tightened together and joined to the lower edge projecting portion 42c, it is possible to ensure the strength of the rear frame 13 by disposing the first upper cross member 44 and the lower cross member 45 at positions into which a load due to vibration of the exhaust muffler 36 is input from the muffler stay 49 supporting the exhaust muffler 36.

An embodiment of the present invention is explained above, but the present invention is not limited to the above embodiment and may be modified in a variety of ways as long as the modifications do not depart from the spirit and scope thereof.

The invention claimed is:

1. A vehicle body frame structure for a saddled vehicle in which a rear frame supporting a riding seat is formed from a fiber-reinforced resin and is linked to a front frame supporting an engine so as to extend to a rear from the front frame, wherein:
   the rear frame comprises a pair of left and right side walls, at least one upper cross member formed separately from the side walls and linking upper parts of the two side walls, and a lower cross member formed separately from the side walls and linking lower parts of the two side walls,
   each of the side walls is formed so as to integrally have a side plate portion forming a vehicle body side face, a flat plate-shaped upper edge projecting portion extending along an upper end of the side plate portion and projecting inwardly from the upper end, and a flat plate-shaped lower edge projecting portion extending along a lower end of the side plate portion and projecting inwardly from the lower end,
   an end part of the upper cross member is joined to the upper edge projecting portion so as to be superimposed vertically, and an end part of the lower cross member is joined to the lower edge projecting portion so as to be superimposed vertically.

2. The vehicle body frame structure for a saddled vehicle according to claim 1, wherein the upper edge projecting portion and the upper cross member are joined to each other via a first rivet so that an adhesive is interposed therebetween, and the lower edge projecting portion and the lower cross member are joined to each other via a second rivet so that an adhesive is interposed therebetween.

3. The vehicle body frame structure for a saddled vehicle according to claim 2, wherein a first fastening part for fastening to the front frame is provided on a front side upper part of the side plate portion, and a second fastening part for fastening to the front frame is provided on a front side lower part of the side plate portion, the upper edge projecting portion is continuous from a position corresponding to the first fastening part to a position joined to the upper cross member, and the lower edge projecting portion is continuous from a position corresponding to the second fastening part to a position joined to the lower cross member.

4. The vehicle body frame structure for a saddled vehicle according to claim 2, wherein said at least one upper cross member comprises a pair of spaced apart front and rear upper cross members, wherein an opening is formed in the side plate portion, an opening edge projecting portion projecting inwardly from a peripheral edge of the opening is provided integrally with the side plate portion, and the opening is disposed in an intermediate position between the pair of front and rear upper cross members in the vehicle fore-and-aft direction.

5. The vehicle body frame structure for a saddled vehicle according to claim 2, wherein a fastening part along a plane that crosses a vehicle width direction obliquely is formed integrally with a front side lower part of the side wall, and the fastening part is fastened to the front frame.

6. The vehicle body frame structure for a saddled vehicle according to claim 2, wherein a front and rear pair of the upper cross members is provided between upper parts of the pair of left and right side walls so that the riding seat is supported by the upper cross members and the upper edge projecting portion between the upper cross members.

7. The vehicle body frame structure for a saddled vehicle according to claim 1, wherein a first fastening part for fastening to the front frame is provided on a front side upper part of the side plate portion, and a second fastening part for fastening to the front frame is provided on a front side lower part of the side plate portion, the upper edge projecting portion is continuous from a position corresponding to the first fastening part to a position joined to the upper cross member, and the lower edge projecting portion is continuous from a position corresponding to the second fastening part to a position joined to the lower cross member.

8. The vehicle body frame structure for a saddled vehicle according to claim 1, wherein said at least one upper cross member comprises a pair of spaced apart front and rear upper cross members, wherein an opening is formed in the side plate portion, an opening edge projecting portion projecting inwardly from a peripheral edge of the opening is provided integrally with the side plate portion, and the opening is disposed in an intermediate position between the pair of front and rear upper cross members in the vehicle fore-and-aft direction.

9. The vehicle body frame structure for a saddled vehicle according to claim 8, wherein the pair of left and right side walls are disposed so that a gap between front parts of the side walls enlarges in going downward, and a cleaner box of an air cleaner is disposed between the front parts of the two side walls.

10. The vehicle body frame structure for a saddled vehicle according to claim 1, wherein a fastening part, extending along a plane that crosses a vehicle width direction obliquely, is formed integrally with a front side lower part of each side wall, and the fastening part is fastened to the front frame.

11. The vehicle body frame structure for a saddled vehicle according to claim 1, wherein a front and rear pair of the upper cross members is provided between upper parts of the pair of left and right side walls so that the riding seat is supported by the upper cross members and the upper edge projecting portion between the upper cross members.

12. The vehicle body frame structure for a saddled vehicle according to claim 11, wherein said at least one upper cross member comprises a pair of spaced apart front and rear upper cross members, wherein the lower cross member is disposed beneath the upper cross member which, among the pair of front and rear upper cross members, is the one to the rear, and the lower cross member and a muffler stay supporting an exhaust muffler are tightened together and joined to the lower edge projecting portion.

13. The vehicle body frame structure for a saddled vehicle according to claim 1, wherein the upper edge projecting portion of each of the side walls extends substantially continuously along the upper edge thereof.

14. A vehicle body frame structure for a saddled vehicle in which a rear frame, for supporting a riding seat, is formed from a carbon fiber-reinforced resin and is linked to a front frame for supporting an engine so as to extend rearwardly from the front frame, wherein:
  the rear frame comprises a pair of left and right side walls, at least one upper cross member, formed from said carbon fiber-reinforced resin separately from the side walls, and linking upper parts of the two side walls, and a lower cross member formed from said carbon fiber-reinforced resin separately from the side walls and linking lower parts of the two side walls,
  each of the side walls is formed so as to integrally have a side plate portion forming a vehicle body side face, an upper edge projecting flange portion formed integrally with and extending inwardly from an upper end of the side plate portion, and a lower edge projecting flange portion formed integrally with and extending inwardly from a lower end of the side plate portion,
  an end part of the upper cross member is joined to the upper edge projecting flange portion so as to be superimposed vertically, and an end part of the lower cross member is joined to the lower edge projecting flange portion so as to be superimposed vertically.

15. The vehicle body frame structure for a saddled vehicle according to claim 14, wherein the upper edge projecting flange portion and the upper cross member are joined to each other via a first rivet so that an adhesive is interposed therebetween, and the lower edge projecting flange portion and the lower cross member are joined to each other via a second rivet so that an adhesive is interposed therebetween.

16. The vehicle body frame structure for a saddled vehicle according to claim 14, wherein a first fastening part for fastening to the front frame is provided on a front side upper part of the side plate portion, and a second fastening part for fastening to the front frame is provided on a front side lower part of the side plate portion, the upper edge projecting flange portion is continuous from a position corresponding to the first fastening part to a position joined to the upper cross member, and the lower edge projecting flange portion is continuous from a position corresponding to the second fastening part to a position joined to the lower cross member.

17. The vehicle body frame structure for a saddled vehicle according to claim 14, wherein the upper edge projecting flange portion of each of the side walls extends substantially continuously along the upper edge thereof.

18. The vehicle body frame structure for a saddled vehicle according to claim 14, wherein said at least one upper cross member comprises a pair of spaced apart front and rear upper cross members, wherein an opening is formed in the side plate portion, an opening edge projecting portion projecting inwardly from a peripheral edge of the opening is provided integrally with the side plate portion, and the opening is disposed in an intermediate position between the pair of front and rear upper cross members in the vehicle fore-and-aft direction.

* * * * *